United States Patent [19]
Ueno et al.

[11] Patent Number: 5,862,429
[45] Date of Patent: Jan. 19, 1999

[54] IMAGE FORMING APPARATUS METHOD FOR MANUFACTURING THE SAME AND METHOD FOR MAINTAINING THE SAME

[75] Inventors: Sueo Ueno, Kawasaki, Japan; Akihiko Kida, Zama, Japan

[73] Assignee: Kabushiki Kaishi Toshiba, Kawasaki, Japan

[21] Appl. No.: 888,689

[22] Filed: Jul. 7, 1997

[30] Foreign Application Priority Data

Jul. 10, 1996 [JP] Japan ..................................... 8-180718

[51] Int. Cl.$^6$ .................................................... G03G 15/00
[52] U.S. Cl. ................................ 399/13; 399/81; 399/126
[58] Field of Search ............................... 399/8, 9, 11, 13, 399/24, 10, 1, 12, 25, 26, 81, 126, 82, 83

[56] References Cited

U.S. PATENT DOCUMENTS

| | | | |
|---|---|---|---|
| 4,870,459 | 9/1989 | Ito et al. | 399/10 |
| 5,200,779 | 4/1993 | Nawata | 399/24 |
| 5,293,197 | 3/1994 | Iwao | 399/83 |

*Primary Examiner*—Arthur T. Grimley
*Assistant Examiner*—Hoan Tran
*Attorney, Agent, or Firm*—Foley & Lardner

[57] ABSTRACT

An image forming apparatus includes a subunit. The subunit includes a non-volatile RAM which previously stores data items corresponding to ID information used in the manufacturing process of parts constructing the image forming apparatus, ID information of the main body of the image forming apparatus, history information of the parts used at the time of service operation and maintenance information. A support tool is connected to a communication I/F in the manufacturing process and at the time of service operation, and necessary information stored in the non-volatile RAM is read out in response to a readout instruction from the support tool and displayed on the display screen of the support tool. Data corresponding to ID information of the part incorporated in the manufacturing process and data corresponding to service information in the service operation are stored in a preset storage area of the non-volatile RAM.

10 Claims, 7 Drawing Sheets

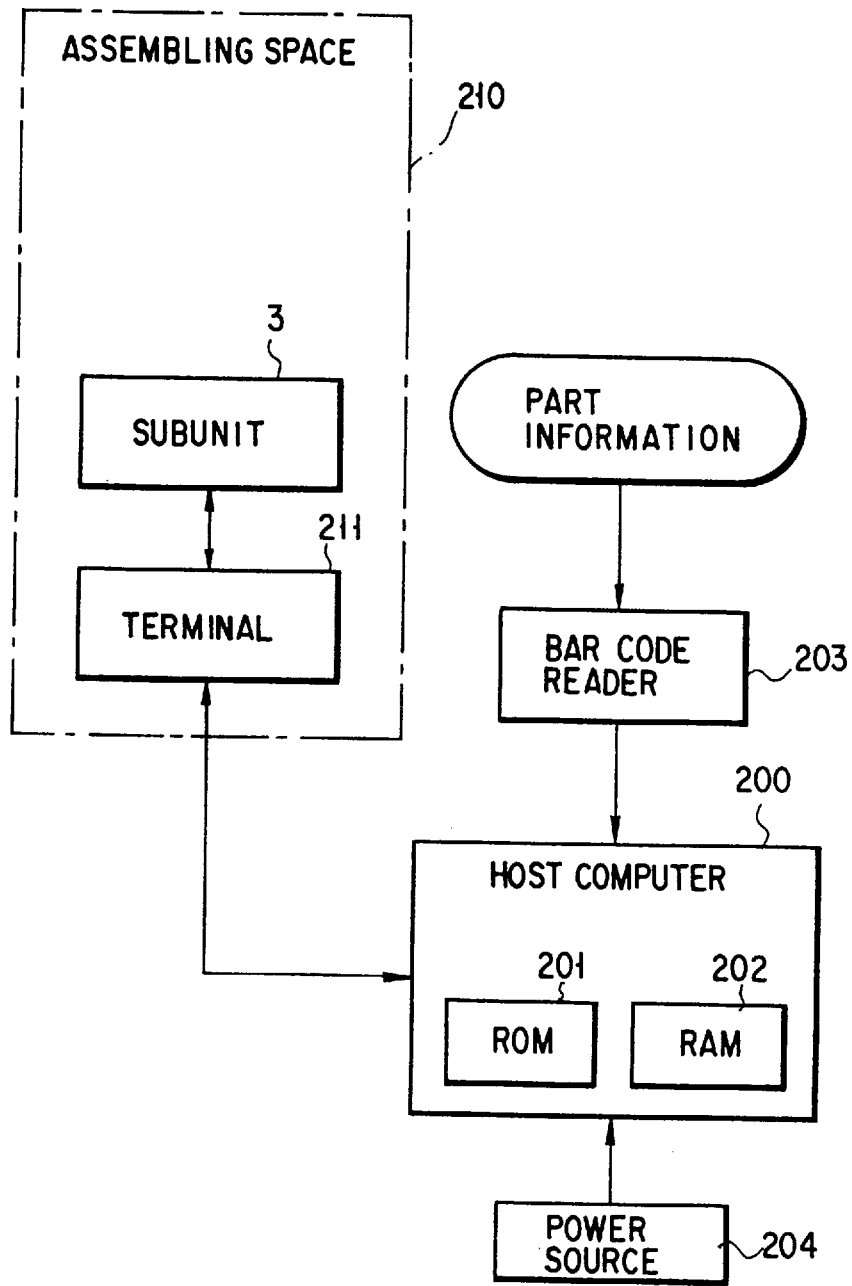
F I G. 6

IMAGE FORMING APPARATUS METHOD FOR MANUFACTURING THE SAME AND METHOD FOR MAINTAINING THE SAME

BACKGROUND OF THE INVENTION

This invention relates to an image forming apparatus for forming an image on a photosensitive body by the electrostatographic process, and more particularly to an image forming apparatus having a communication device for receiving and transmitting information such as service information of the apparatus and ID information of parts thereof, a method for manufacturing the same, and a method for maintaining the same.

An image forming apparatus utilizing the electrostatographic process, for example, an electrophotographic copying machine includes an original holding section for holding an original to be copied, an image reading section for reading image information of the original held by the original holding section as information of brightness, and an image forming section for forming a copying image based on the image information read by the image reading section and printing the copying image on a recording material such as paper.

In the process of assembling the image forming apparatus such as the above electrophotographic copying machine, for example, information items of the lot number, the assembling method of the apparatus in the production line and the like are identified by the operator by visually observing a number ticket. Selection of parts and assembling of the apparatus are effected based on the judgment of the operator.

Further, service operations such as investigation on defective portions of the apparatuses manufactured and put on the market, preparation of parts and repair are performed based on the judgment of the serviceman according to the manufacture's serial number attached to the apparatus.

In the above apparatus, since parts are mounted according to the judgment of the operator based on the visual observation and the apparatus is assembled, occurrence of erroneous mounting of parts of a lot cannot be checked at the assembling time even if such erroneous mounting of parts occurs at the assembling time. Therefore, defective portions will be detected after the apparatuses are put on the market.

In order to cope with the above defective portion, a skilled serviceman is required to disassemble the apparatus to search for the cause of the defective portion, order a corresponding part and replace the defective part by the new part, and as a result, the service efficiency is lowered.

Further, in the process of manufacturing the above apparatus, one type of apparatus is manufactured in one production line to prevent the operator's work from becoming complicated, thereby making it difficult to mass-produce various types of apparatuses by occupying the production line. Therefore, there occurs a possibility that quick response to the market needs becomes difficult and the manufacturing cost will rise accordingly.

Thus, in the conventional apparatus, a lowering in the reliability due to frequent occurrence of erroneous operations in the simple operation at the manufacturing time, a lowering in the service quality at the time of maintenance after the apparatus is put on the market, and a rise in the manufacturing cost because of difficulty in the mass production of various types of apparatuses may occur.

BRIEF SUMMARY OF THE INVENTION

An object of this invention is to provide an image forming apparatus and an assembling method thereof which can enhance the reliability and lower the cost.

Another object of this invention is to provide a maintenance method for an image forming apparatus which can enhance the service quality.

In order to attain the above object, according to one aspect of this invention, there is provided a method for assembling an image forming apparatus which includes image forming means for forming an image on a recording medium, communication means for communicating data between the image forming means and an external device, and storage means provided in the image forming means, for storing data relating to parts constructing the image forming means, comprising the steps of connecting the storage means and the external device to each other by use of the communication means; comparing data of a part input via the communication means by the external device with data of a preset part stored in the storage means to determine whether the input data of the part is proper or not; assembling a part which is determined to be proper in the determining step; and storing data of the part assembled in the assembling step into the storage means.

In order to attain the above object, according to another aspect of this invention, there is provided an image forming apparatus comprising image forming means for forming an image on a recording medium; communication means for communicating data between the image forming means and an external device; and storage means including a first storage area which previously stores data relating to parts necessary for constructing the image forming means and read out and supplied to the external device via the communication means when the parts are assembled and a second storage area for storing data input from the external device via the communication means after the parts are assembled and relating to the parts assembled to construct the image forming means.

In order to attain the above object, according to still another aspect of this invention, there is provided a maintenance method for an image forming apparatus which includes image forming means for forming an image on a recording medium, communication means for communicating data between the image forming means and an external device, and storage means provided in the image forming means, for storing data relating to a maintenance method for the parts constructing the image forming means, comprising the steps of connecting the storage means and the external device to each other by use of the communication means; reading out data relating to the maintenance method of the part and stored in the storage means and supplying the data to the external device; effecting the maintenance process based on the data read out in the readout step; and storing data of the part which is subjected to the maintenance process in the maintenance step into the storage means.

According to this invention, data of parts necessary for assembling an image forming apparatus is previously stored in the storing means which is mounted on the main body thereof and data of parts stored in the storing means is compared with data of parts input from an external device via communication means of the image forming apparatus at the time of assembling so that the assembling process can be effected while checking whether parts to be used for assembling are proper or not. Therefore, it becomes possible to prevent erroneous parts from being mounted and provide an image forming apparatus with high reliability.

Further, since whether parts are proper or not is checked for each part, mass production of various types of image forming apparatuses can be attained by use of a less number of production lines and the cost of the image forming apparatus can be lowered.

Further, according to this invention, data such as a lot number relating to mounted parts is stored in the storing means. Therefore, at the time of service operation, data of parts stored in the storing means can be read out and used for maintenance. Thus, it is possible to easily acquire data of parts at the time of maintenance and enhance the service quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 6 is a diagram schematically showing one example of a production line at the time of assembling of the copying machine shown in FIG. 1;

DETAILED DESCRIPTION OF THE INVENTION

There will now be described an image forming apparatus according to an embodiment of this invention with reference to the accompanying drawings.

Figure 1:
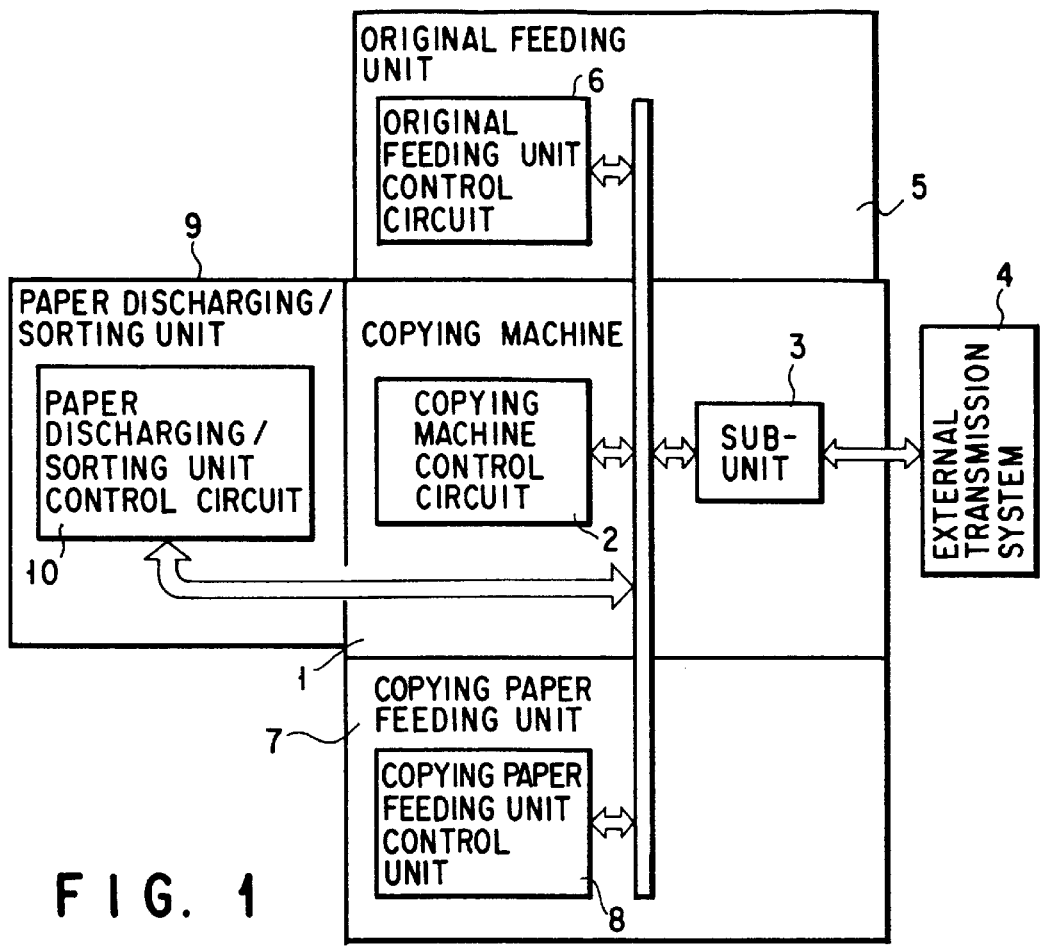
FIG. 1 is a block diagram schematically showing a copying machine provided as an example of an image forming apparatus of this invention.
Figure 2:
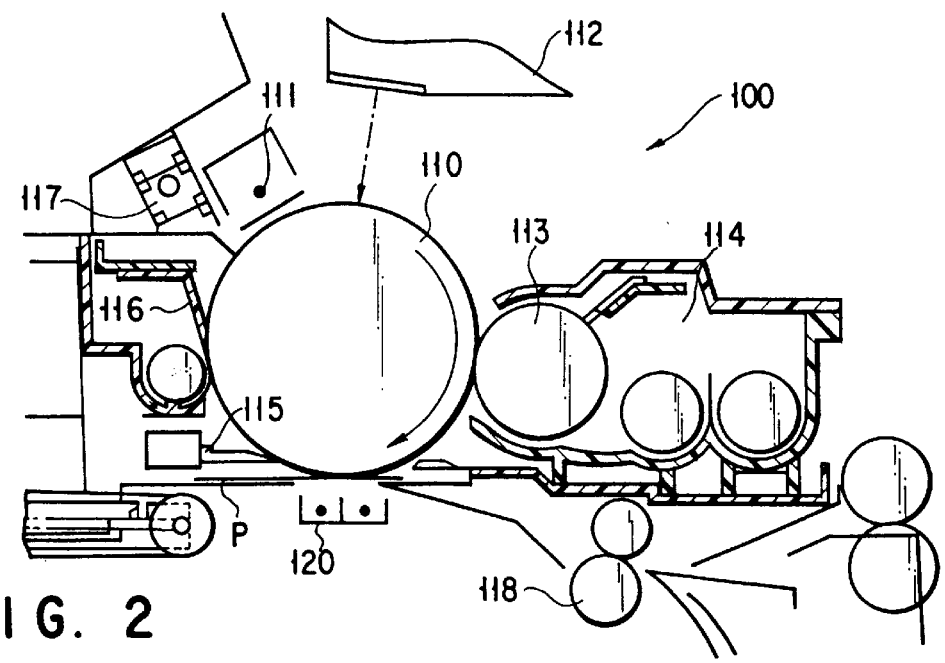
FIG. 2 is a cross sectional view schematically showing an image forming section of the copying machine shown in FIG. 1.

As shown in FIGS. 1 and 2, the main body of a copying machine 1 includes an image reading section (not shown) for reading an image of an original set in a fixed position on an original table as information of brightness, and an image forming section 100 for forming a copying image based on image data corresponding to the original image read by the image reading section and printing the copying image on a recording material such as paper.

That is, the image forming section 100 has a photosensitive drum 110 rotatably mounted on substantially the central portion of the image forming apparatus. The photosensitive drum 110 is formed of an organic photoconductor (OPC) which is a cylinder formed to extend in a preset direction and whose diameter is 100 mm, for example. The photosensitive drum 110 is rotated at a preset rotation speed, for example, at a peripheral speed of 200 mm/sec by a motor (not shown).

A charging unit 111 for charging the drum surface to a preset potential is arranged in a preset position near the photosensitive drum 110 to face the peripheral surface thereof.

An optical scanning unit or laser exposing unit 112 for forming an electrostatic latent image on the surface of the photosensitive drum 110 by exposing a laser beam corresponding to image data to the surface of the photosensitive drum 110 is disposed on the downstream side of the charging unit 111 along the rotating direction of the photosensitive drum 110.

A developing unit 114 having a developing roller 113 for supplying toner as developing powder to the electrostatic latent image formed on the photosensitive drum 110 to develop the electrostatic latent image and forming a toner image with desired image density is disposed on the downstream side of the laser exposing unit 112.

A transfer/separation charger 120 for transferring the toner image formed on the photosensitive drum 110 to copying paper P fed from a copying paper feeding unit which will be described later or a manual paper feeder and separating the paper P having the toner image transferred thereon from the photosensitive drum 110 is disposed on the downstream side of the developing unit 114.

A separation claw 115 for separating the copying paper P from the surface of the photosensitive drum 110, a cleaning unit 116 for cleaning toner remaining on the surface of the photosensitive drum 110 and a discharging unit 117 for discharging charges remaining on the surface of the photosensitive drum 110 are arranged in this order on the downstream side of the transfer/separation charger 120.

In a case where the image forming section 100 is provided in an image forming apparatus such as a printer or facsimile, the laser beam emitted from the laser exposing unit 112 is subjected to the intensity modulation based on image data supplied via an external interface (not shown).

Further, in a case where the image forming section 100 is provided in an image forming apparatus such as a digital copying machine, the laser beam emitted from the laser exposing unit 112 is subjected to the intensity modulation based on image data of an original image read by an image reading section (not shown).

As shown in FIG. 1, an original feeding unit 5 for sequentially setting a plurality of originals one by one in a fixed position on the original table provided on the upper portion of the copying machine 1 and discharging the original set in the fixed position on the original table to a preset position after the image forming operation by the image reading section and image forming section is completed is mounted on the upper portion of the main body of the copying machine 1.

A copying paper feeding unit 7 having a plurality of cassette type paper feeding trays in each of which sheets of copying paper of a corresponding one of different sizes are set is provided below the main body of the copying machine 1.

A paper discharging/sorting unit 9 for discharging copying paper on which a copying image corresponding to the original image is printed by the image forming unit in the main body of the copying machine 1 and sorting sheets of copying paper for every preset number of copies based on a preset instruction signal is disposed on one side of the copying machine 1.

The main body of the copying machine 1 includes a copying machine control circuit 2 (which is hereinafter referred to as a control circuit 2) functioning as a main control unit for controlling the operations of the respective sections which are not described in detail. For example, the control circuit 2 controls the processes for copying an original such as charging, exposing, developing, transferring, separation, fixing, cleaning, discharging processes in the image forming section and controls the related operations of the main body of the copying machine 1 and the associated units such as the original feeding unit 5, copying paper feeding unit 7 and paper discharging/sorting unit 9.

An original feeding unit control circuit 6 (which is hereinafter referred to as a control circuit 6) provided for the original feeding unit 5 is connected to the control circuit 2 and controls the operations of the respective sections of the original feeding unit 5 which are not described in detail based on a control signal from the control circuit 2. For example, the control circuit 6 controls the operations of the respective sections based on a control signal from the control circuit 2 to set originals one at a time in a preset position on the original table and then discharge the original.

A copying paper feeding unit control circuit 8 (which is hereinafter referred to as a control circuit 8) provided for the copying paper feeding unit 7 is connected to the control circuit 2 and controls the operations of the respective sections of the copying paper feeding unit 7 which are not described in detail based on a control signal from the control circuit 2. For example, the control circuit 8 selects one of the cassette trays of corresponding paper size according to a control signal from the control circuit 2 and controls the paper feeding motor to feed the paper of selected size to the image forming section of the main body of the copying machine.

A paper discharging/sorting unit control circuit 10 (which is hereinafter referred to as a control circuit 10) provided for the paper discharging/sorting unit 9 is connected to the control circuit 2 and controls the operations of the respective sections of the paper discharging/sorting unit 9 which are not described in detail based on a control signal from the control circuit 2. For example, the control circuit 10 effects the control operation to operate the paper discharging trays for sorting according to the number of copies to be sorted based on a control signal from the control circuit 2.

Next, the operation of the image forming apparatus is explained.

The image forming apparatus is warmed up and set into a standby state in which an image can be formed based on image data after a main switch (not shown) is turned ON. Image data supplied from the image forming section or an external device such as an external word processor or computer is temporarily stored in a memory and then supplied to the laser exposing unit 112.

When image data is started to be supplied, the photosensitive drum 110 of the image forming section 100 is rotated at a desired rotation speed, for example, at a peripheral speed of 200 mm/sec, and at the same time, it is uniformly charged to a desired potential, for example, −700 V via the charging unit 111. At this time, the manual paper feeder or one of the paper cassettes of the copying paper feeding unit 7 in which sheets of paper P usable for printing an image based on the image data is selected. Then, sheets of paper P are fed one by one from the selected paper cassette or manual paper feeder to an aligning roller 118 via a feeding path.

The image data is supplied to the laser exposing unit 112, and the intensity of the laser beam emitted from the laser light source in the laser exposing unit 112 is continuously modulated according to the image data. The laser beam corresponding to the image data and emitted from the laser exposing unit 112 is successively applied to the photosensitive drum 110 to form an electrostatic latent image of negative polarity thereon.

The electrostatic latent image formed on the photosensitive drum 110 is carried to the developing unit 114 by rotation of the photosensitive drum 110, then supplied with toner via the developing roller 113 and developed. That is, a toner image is formed on the photosensitive drum 110. The toner image is further carried to an image transferring area facing the image transferring/separation charger 120 by rotation of the photosensitive drum 110.

The paper P which is temporarily stopped on the aligning roller 118 is fed towards the photosensitive drum 110 at a timing at which the front end of the toner image on the photosensitive drum 110 is aligned with the front end of the paper P. Then, the paper P is attracted and held on the photosensitive drum 110 by the force of charges remaining on the photosensitive drum 110 at a preset timing and is brought into close contact with the toner image on the photosensitive drum 110.

After this, charges of polarity opposite to the charges which are already charged on the photosensitive drum 110 for formation of a latent image are supplied from the image transferring/separation charger 120 towards the photosensitive drum 110 and paper P so as to transfer the toner image on the photosensitive drum 110 to the paper P.

The paper P having the toner image transferred thereon is separated from the photosensitive drum 110 with the assistance of the separation claw 115 and fed to a fixing unit (not shown). In the fixing unit, toner which is thermally fusible is placed under high pressure and high temperature and melted and thus the toner image is fixed on the paper P.

The photosensitive drum 110 from which the paper P and toner image are separated is further rotated and subjected to the cleaning process by the cleaning unit 116 and discharging unit 117 so as to restore the initial state of the surface charge distribution and makes ready for the next image formation.

Figure 3:
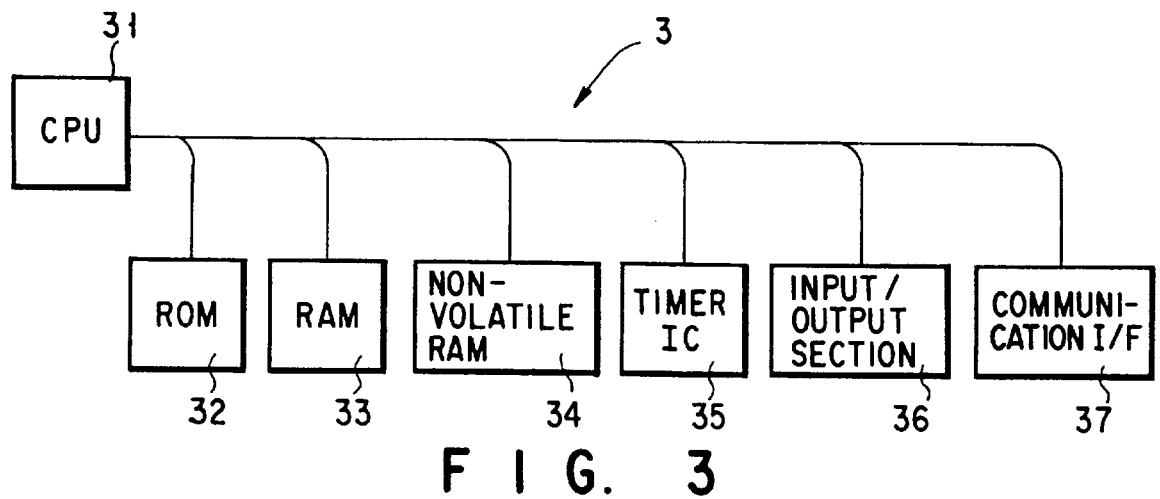
FIG. 3 is a block view schematically showing a subunit provided in the copying machine shown in FIG. 1.

As shown in FIG. 3, the main body of the copying machine 1 includes a subunit 3.

The subunit 3 includes a general control circuit for effecting the system control with respect to the external device at the time of manufacturing the main body of the copying machine 1, at the time of service operation on the market or the like. For example, the subunit 3 is connected to the external associated device and used to transfer control signals and data signals. Further, the subunit 3 is used to instruct the operator or serviceman on the order of priority of the respective operations at the time of manufacturing or service operation. Also, the subunit 3 is used to modulate or demodulate a signal used for communication with an external device. In addition, the subunit 3 is used to accumulatively store various types of adjustment information items and ID information items of parts at the time of manufacturing or service operation and make use of the above information items in the self-diagnosing or self-checking function as history information and maintenance information.

As shown in FIG. 3, the subunit 3 includes a CPU 31 as a central processing unit, read-only memory (which is hereinafter referred to as a ROM) 32, random access memory (which is hereinafter referred to as a RAM) 33, non-volatile memory 34, timer IC 35, input/output section 36 and communication I/F 37.

The CPU 31 of the subunit 3 executes processes necessary for various adjustments in the service process and manufacturing process of the main body of the copying machine 1, management of data stored in the subunit 3 and control of the respective sections of the subunit 3.

The ROM 32 is an optical disk type memory as is represented by a compact disk or semiconductor memory, for example, and previously stores data necessary for the CPU 31 to effect the control operation. Data stored in the ROM 32 is read out in response to an instruction from the CPU 31 as required. The CPU 31 effects the control for the respective sections based on the readout data.

The ROM 32 stores the procedure of a sequence of operations associated with the data accumulating process for accumulating various data items relating to the copying machine 1, the procedure of diagnosing operations based on the accumulated data items, and the procedure of a sequence of communication operations with respect to the external transmission system 4. The CPU 31 determines and selects the sequence operation of data accumulation corresponding to a signal from the main body of the copying machine 1, for example, a signal of the copying size or the number of copies supplied from the input device provided in the copying machine 1 and then causes the main body of the copying machine 1 to output corresponding data. Thus, the operation of the main body of the copying machine 1 is controlled.

For example, the RAM 33 is a memory as is represented by a semiconductor memory with which data can be freely written or read out and is used to temporarily store data of a sensor output obtained at the time of copying operation, for example, and permit the data to be freely corrected for each copying operation so as to enhance the quality of the image. Further, sequence information of the copying operation specified by the input/output section 36 is temporarily stored to permit the state of the copying operation to be displayed on a display unit on the main body side of the copying machine 1 so as to inform the present state of the main body of the copying machine 1 to the outside.

The non-volatile RAM 34 is a memory with which data can be written in or read out as is represented by a battery backup type semiconductor memory, floppy disk, hard disk, writable optical disk, or rewritable optical disk, for example. Written data can be permanently held irrespective of the turn-ON or turn-OFF of the power source of the main body of the copying machine 1 if the data is not erased.

In the non-volatile RAM 34, data items corresponding to information associated with the copying machine 1, for example, ID information recorded at the initial stage of the manufacturing process, information items output from various sections of the copying machine as required by the control operation of the CPU 31, and abnormal operation information derived from the original feeding unit 5, copying paper feeding unit 7, paper discharging/sorting unit 9 and the like shown in FIG. 1 or history information of parts are written.

The timer IC 35 always counts date and time and can measure desired unit time by the interruption process.

In the input/output section 36, output signals from the various types of sensors provided in the copying machine 1, for example, error signals and data signals relating to the control operation associated with the related operations of the original feeding unit 5, copying paper feeding unit 7, paper discharging/sorting unit 9 and the like shown in FIG. 1 are transferred.

The communication I/F 37 is a terminal which can be used for wire, radio or optical communication, for example. The communication I/F 37 can be connected to a data base of manufacturing information, a host computer in the production line, a terminal of a portable device which a serviceman has, or the like, and the data writing and readout operations can be effected via the communication I/F 37.

Figure 4:
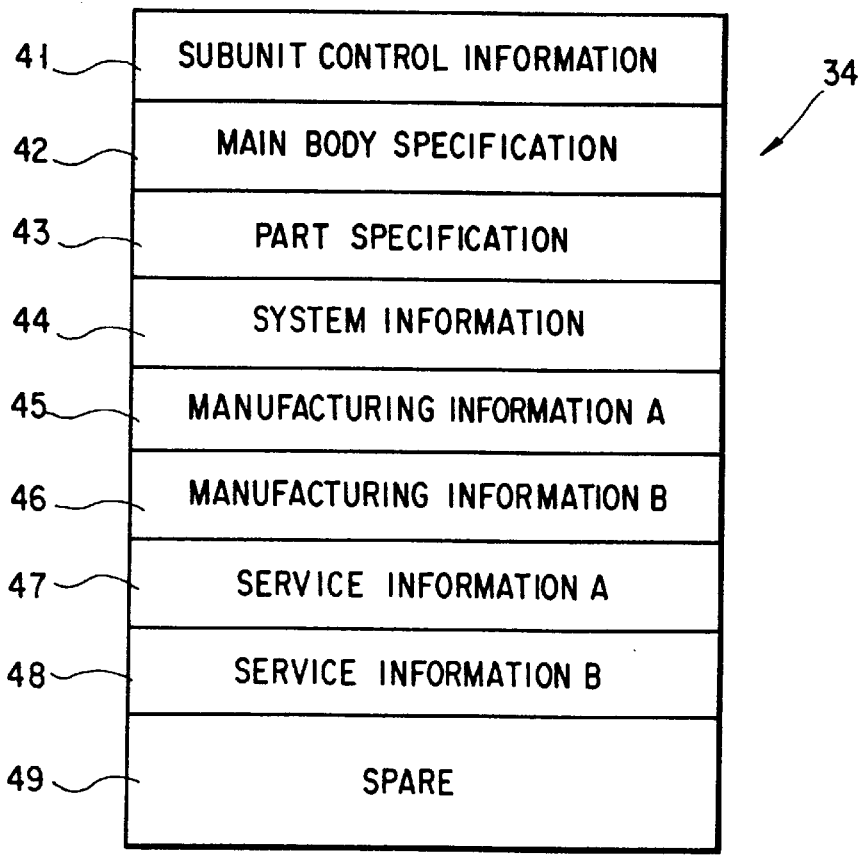
FIG. 4 is a memory map showing the content of a non-volatile RAM contained in the subunit shown in FIG. 3.

As shown in FIG. 4, the non-volatile RAM 34 includes a plurality of information areas 41 to 49.

In a subunit control information area 41, data corresponding to control information of the subunit 3 is stored.

In a main body specification area 42, data corresponding to information of the specification of the main body such as the name of the type, the name of the model, the lot number or the destination of the copying machine 1 is stored.

In a component part specification area 43, information relating to component parts necessary for assembling the copying machine 1 is stored.

In a system information area 44, data corresponding to information relating to systems such as the original feeding unit and paper discharging/sorting unit additionally attached to the copying machine 1 is stored.

In a manufacturing information A area 45, data corresponding to ID information of component parts incorporated at the manufacturing time of the copying machine 1 is stored.

In a manufacturing information B area 46, data corresponding to information relating to error items and special items occurring in the manufacturing process is stored.

In a service information A area 47, data corresponding to maintenance information such as service operating information of the copying machine 1 is stored.

In a service information B area 48, data corresponding to information on the result of service operation of the copying machine 1 is stored.

A spare area 49 is a spare storage area for data to be stored in the storage areas 41 to 48.

Figure 5:
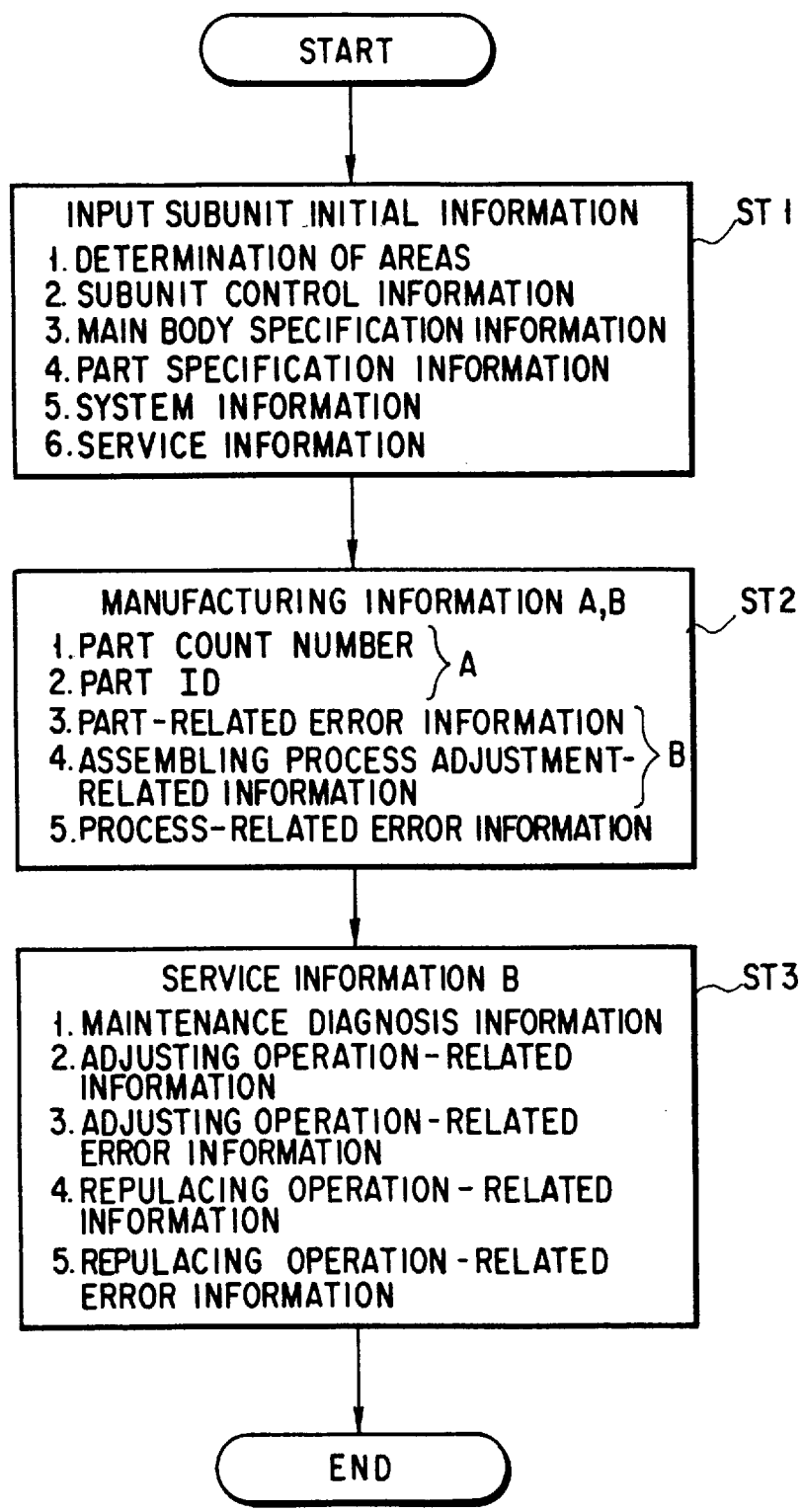
FIG. 5 is a flowchart showing the input timing of the stored content shown in FIG. 4.

FIG. 5 is a flowchart showing the input timings of information items stored in the storage areas 41 to 48 of the non-volatile RAM 34.

First, in the step 1 (ST1) before the subunit 3 is set in the production line, initial information of the subunit 3 is previously input.

That is, in the non-volatile RAM 34, the subunit control information area 41, main body specification area 42, component part specification area 43, system information area 44, manufacturing information A area 45, manufacturing information B area 46, service information A area 47, service information B area 48, and spare area 49 are determined.

Then, data items corresponding to subunit control information, main body specification information, component part specification information, and system information are input to the respective storage areas 41 to 44. Further, data corresponding to service information for supporting the service operation of a serviceman is input to the service information A area 47.

Next, in the step 2 (ST2) in the manufacturing process when the subunit is set in the production line, data items corresponding to the count number of component parts and ID information of the component parts are input to the manufacturing information A area 45. Further, data items corresponding to error information associated with the component parts and occurring in the manufacturing process, information associated with the adjustment required at the time of assembling of the parts, and error information occurring in the assembling process are input to the manufacturing information B area 46.

Then, in the step 3 (ST3) in which the serviceman effects the service operation after the assembling of the copying machine is completed, data items corresponding to maintenance diagnostic information items such as service history information and various diagnostic information items, adjusting operation-related information items, adjusting operation-related error information items, replacing operation-related information items, replacing operation-related error information items are input to the service information B area 48.

In FIG. 6, a host computer used as a support tool for inputting information to the non-volatile RAM 34 of the subunit 3 in the production line in which the copying machine is manufactured is schematically shown.

As shown in FIG. 6, a host computer 200 has a ROM 201 as a read-only memory which stores control information and a RAM 202 as a rewritable memory for temporarily storing information input to the host computer 200.

The host computer 200 is connected to a bar code reader 203 which reads data corresponding to ID information of the component part, for example, a bar code. ID data items of the component parts incorporated into the copying machine are read by the bar code reader 203 when the copying machine is assembled.

Further, the host computer 200 is connected to a terminal 211 provided in an assembling space 210 in which the copying machine is assembled on the production line. The subunit 3 including the non-volatile RAM 34 which has the subunit control information, main body specification information, component part specification information, and system information previously stored therein (ST1) is disposed in the assembling space 210 and connected to the terminal 211 via the communication I/F 37 in ST2. With this connection, the subunit 3 is connected to the host computer 200 via the terminal 211.

The host computer 200 is connected to a power source 204, and the power source for starting the host computer can be securely obtained and the power source for starting the subunit 3 can also be securely obtained via the terminal 211.

The host computer 200 reads out data such as main body specification information and component part specification information from the non-volatile RAM 34 of the subunit 3 and temporarily stores the readout data into the RAM 202. At this time, ID data of a component part to be incorporated is read by the bar code reader 203 and then input to the host computer 200. The host computer 200 compares the read ID data of the component part with data stored in the RAM 202 to determine whether the specification of the component part to be incorporated is proper or not. The result of determination is displayed on the display screen of the host computer 200 or output as voice or the like.

Further, the ID data of the incorporated part is input to the non-volatile RAM 34 of the subunit 3 from the host computer 200.

Figure 7:
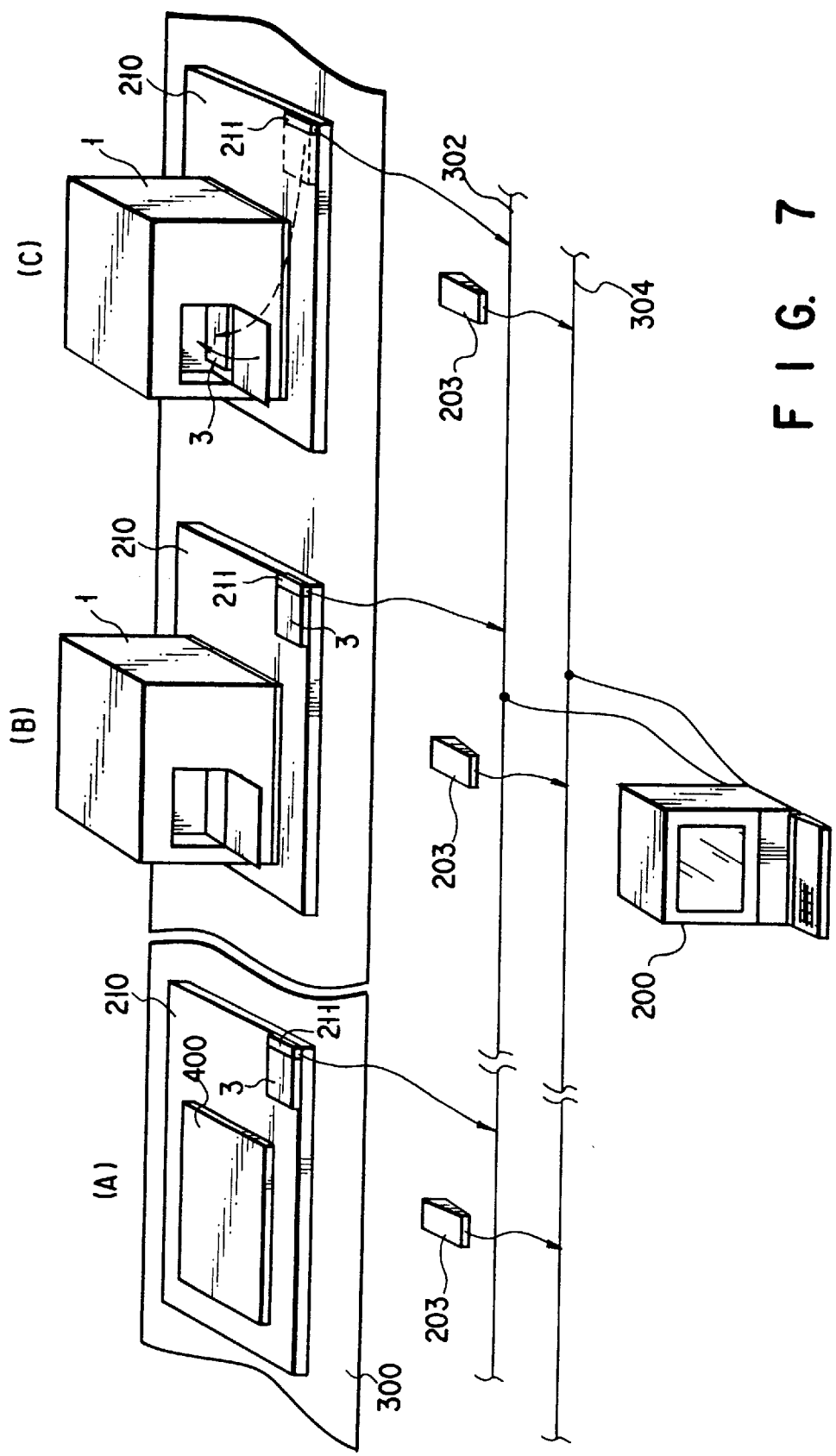
FIG. 7 is a view schematically showing the process of assembling copying machines in the production line shown in FIG. 6.

FIG. 7 shows one example of the production line.

The assembling spaces 210 are provided in preset positions on a belt conveyor 300 in the production line. The subunit 3 is disposed in a preset position of the assembling space 210. The subunit 3 is connected to the terminal 211 provided for each assembling space via the communication I/F. Each of the terminals 211 is connected to a communication line 302 to connect the subunit 3 with the host computer 200.

Further, the bar code reader 203 is disposed in each assembling position on the production line. Each of the bar code readers 203 is connected to a communication line 304 to connect the bar code reader 203 with the host computer 200.

The communication lines 302, 304 are connected to the host computer 200. In this example, each terminal and each bar code reader are connected to the host computer via the communication lines, that is, wires, but may be communicated with the host computer by radio.

As shown in FIG. 7, in the step (A) in the production line, a base plate 400 of a copying machine is placed on the assembling space 210. In the preset position of the assembling space 210, the subunit 3 including a non-volatile RAM in which data is previously stored is disposed and connected to the terminal 211 via the communication I/F. The host computer 200 reads out data from the subunit 3 and stores the readout data into the RAM 202. Then, the process for manufacturing a copying machine is started.

At the time of manufacturing a copying machine, the operator inputs ID data of a part to the host computer 200 via the bar code reader before the part is incorporated. At this time, the host computer 200 compares the input ID data of the part with specification data of the component part stored in the RAM 202. That is, whether or not the input ID data is included in the specification data stored in the RAM 202 is checked and whether or not the part is proper as a part to be incorporated is determined. If it is determined that the part is not proper, this is informed to the operator. Thus, component parts are sequentially incorporated to manufacture a copying machine. ID data items of the incorporated component parts are input to the subunit 3.

The step (B) in the production line is a state in which a copying machine is completed. That is, all of the component parts of the copying machine are incorporated.

Finally, in the step (C), the subunit 3 having ID data items of all of the component parts stored therein is disconnected from the terminal 211 and incorporated into the copying machine 1. Then, a lid is put into a closed state to prevent a person other than the serviceman from accessing the subunit after the copying machine is put on the market.

Figure 8:
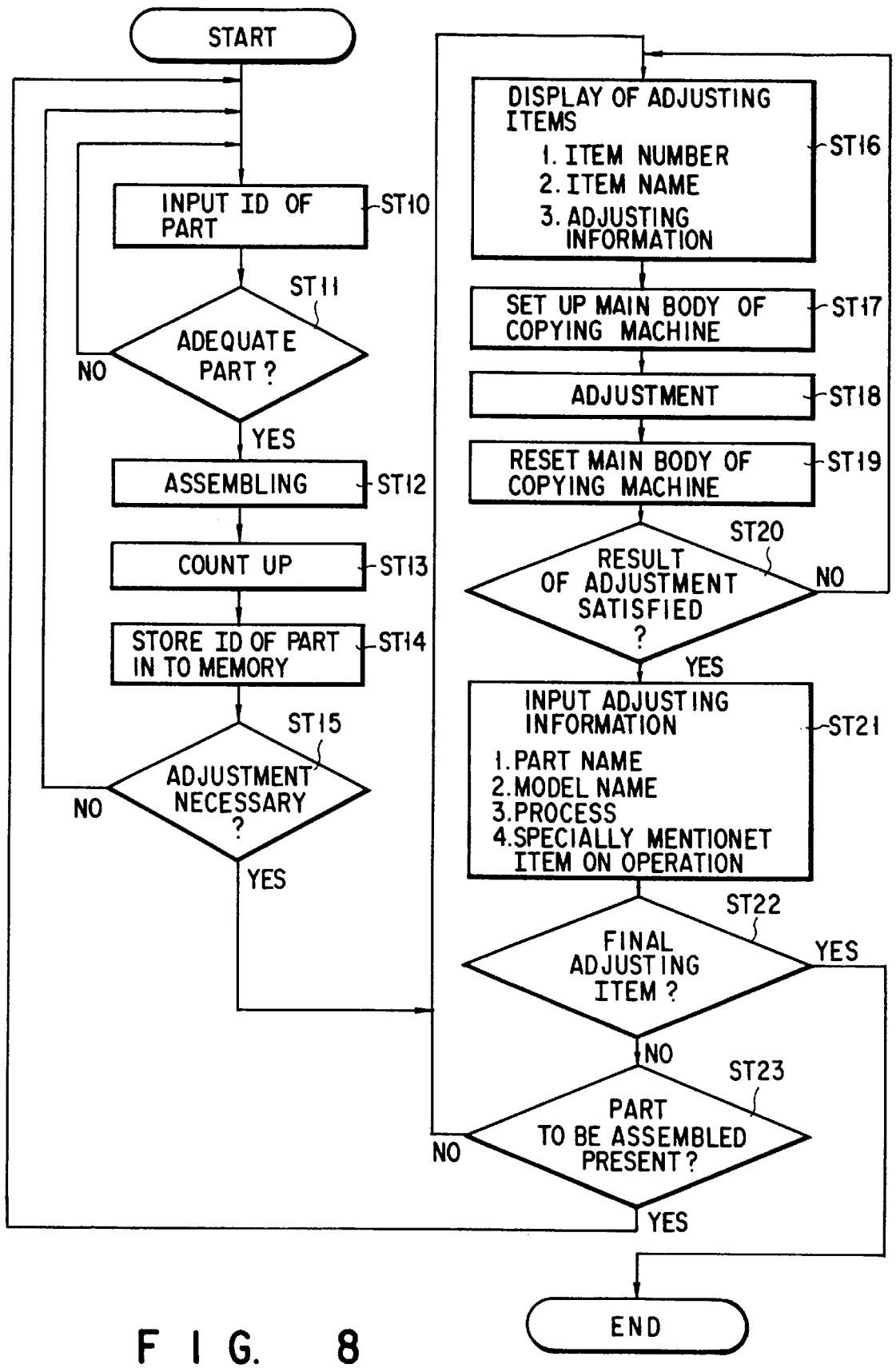
FIG. 8 is an operation flowchart schematically showing the manufacturing process of the copying machine shown in FIG. 1.

Next, the manufacturing process of the copying machine is explained with reference to the flowchart shown in FIG. 8.

First, the subunit 3 including the non-volatile RAM 34 in which data is previously stored in ST1 is set on the assembling space 210 of the production line and connected to the host computer 200 via the terminal 211 and communication line 302.

Then, the assembling operation is effected.

That is, the assembling base plate 400 of a copying machine to be assembled in the assembling space 210 is set beside the subunit 3. Then, the subunit 3 and the base plate 400 are carried together on the belt conveyor 300 in the production line.

The component parts of the copying machine to be assembled are attached with bar codes corresponding to the respective ID data items thereof.

At the time of assembling the copying machine, the operator first reads a bar code of the component part by use of the bar code reader 203 to input the ID data of the component part to the host computer 200 (ST10).

The host computer 200 reads out data corresponding to component part specification information stored in the non-volatile RAM 34 of the subunit 3, compares the readout data with input ID data of the component part to determine whether or not the component part is proper or not (ST11). The result of determination is displayed on the display screen of the host computer 200, for example. The operator effects the operation based on the result of determination displayed on the display screen.

When it is determined that the component part is proper, the operator effects the assembling operation of incorporating the component part whose ID data has been input into the main body (ST12). On the other hand, if it is determined that the component part is not proper, the operator interrupts the operation of incorporating the part and inputs ID data of a new proper part.

Then, the serial number of a component part which is determined proper is counted up (ST13) and ID data of the component part is stored into the manufacturing information A area of the non-volatile RAM 34 (ST14).

Then, whether the adjustment of the assembled component part is necessary or not is determined by the operator (ST15).

If the adjustment is not necessary, the operation of incorporating another component part is effected. That is, the process from the step 10 to the step 14 is effected again.

A case wherein the adjustment is required occurs in a case where an optical unit of the copying machine is incorporated, for example. In this case, the adjustment of the optical system is required.

When the adjustment is necessary, the operator effects the operation to display the items of adjustment on the display screen of the host computer 200 (ST16). Then, the adjusting item number, adjusting item name, adjusting information and the like which is stored in the subunit are displayed on the display screen.

Next, after the main body of the copying machine which is being assembled is set up into the adjustment standby state (ST17), the operator effects the adjusting operation of the incorporated component part based on the displayed adjusting items and adjusting information for each item (ST18).

After completion of the adjustment, the main body of the copying machine is reset and then made operative (ST19).

Thus, the copying machine is set into the operative state to check whether the result of adjustment is satisfied or not (ST20). If the adjustment is not satisfied, the process is returned to the step 16 to effect the adjusting operation again.

If the adjustment is satisfied, adjusting information of the component part adjusted by the adjusting operation is input to the subunit 3 from the host computer 200 (ST21). In the subunit 3, data corresponding to the input adjusting information such as the component part name, model name, operation process and specially mentioned item on the operation is stored into the manufacturing information B area 46 of the non-volatile RAM 34.

Then, whether or not the adjusting operation of the component part effected corresponds to the final adjustment item is determined (ST22) and if it is the final adjusting item, the manufacturing process is terminated.

If it is not the final adjusting item, the serial number of the component part is checked and whether a component part which is not yet assembled is present or not is determined (ST23).

If a component part to be assembled is present, the process is returned to the step 10 to continue the assembling operation of the component part. If a component part to be assembled is no more present, the process is returned to the step 16 to effect the adjusting operation for the next adjusting item.

Finally, the subunit 3 containing the non-volatile RAM 34 having storage areas in which respective data items are stored is disconnected from the terminal 211 of the assembling space 210 and incorporated into the main body of the copying machine 1 to complete the whole assembling operation.

Figure 9:
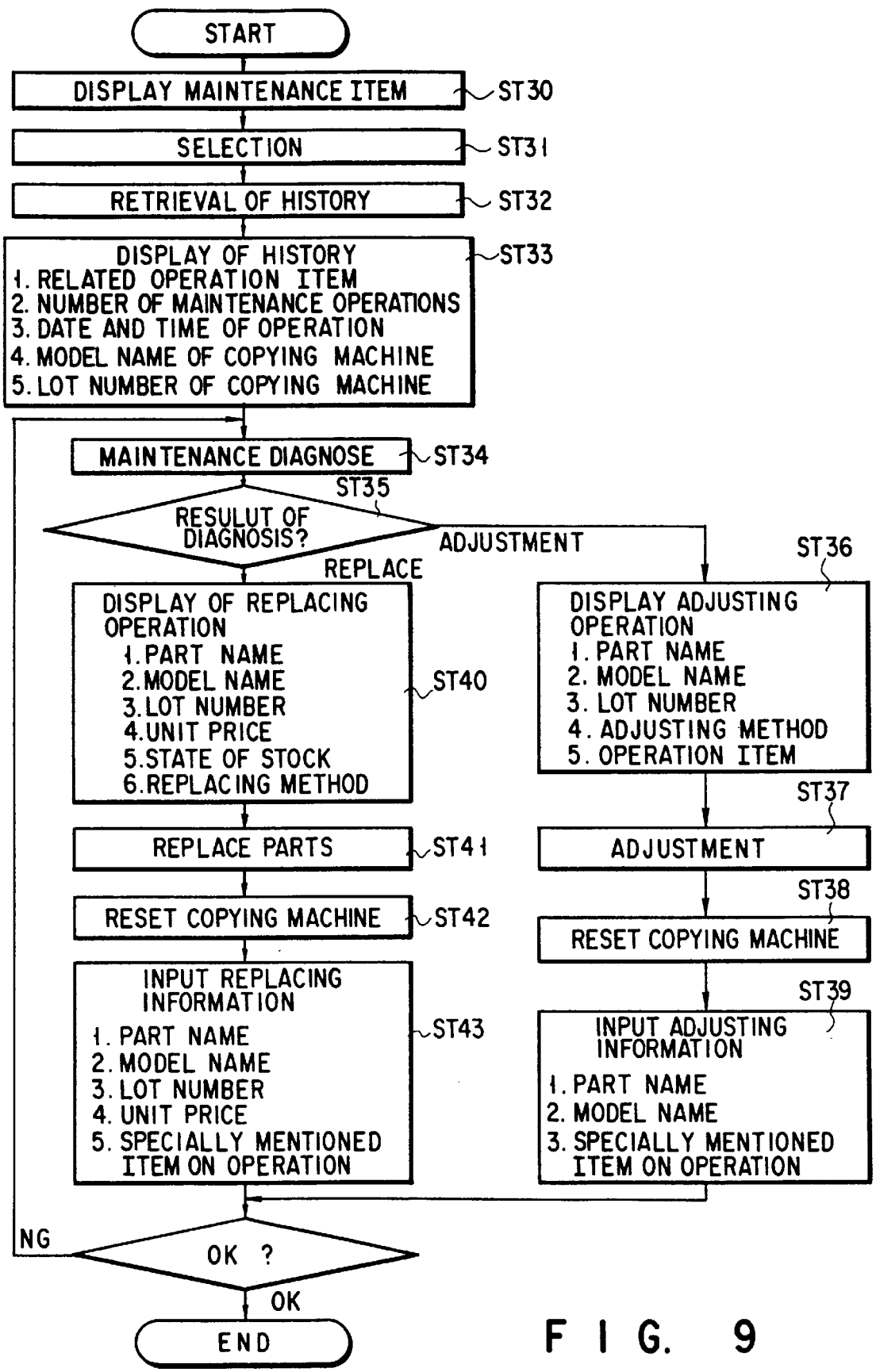
FIG. 9 is an operation flowchart schematically showing the maintenance process at the time of service operation for the copying machine shown in FIG. 1.

Next, the operation process in the service operation of the copying machine is explained with reference to the flowchart shown in FIG. 9.

When the serviceman effects the service operation such as the maintenance operation for the copying machine put on the market, the serviceman first connects a service support tool as is represented by a portable type information terminal or note type personal computer to the communication I/F 37 of the subunit 3 incorporated into the main body of the copying machine 1. Then, the necessary operation is effected to display the menu screen of the maintenance items on the display screen of the service support tool (ST30). That is, data corresponding to the maintenance information previously stored in the service information A area 47 in the non-volatile RAM 34 of the subunit 3 is read out from the service support tool.

Then, the serviceman selects a necessary item from the menu screen of the maintenance items displayed on the display screen (ST31). In response to the selected item, the service support tool retrieves history information items relating to the corresponding maintenance item from the service information A area 47 and service information B area 48 of the non-volatile RAM 34 contained in the subunit 3 (ST32) and displays the result of retrieval on the display screen (ST33).

History information items such as the related operation item, the number of maintenance operations, the date and time of the operations, the name of the model of the main body of the copying machine and the lot number of the copying machine are displayed on the display screen based on the result which the serviceman has selected.

The serviceman checks or diagnoses the copying machine based on the history information relating to the maintenance items displayed on the display screen of the service support tool (ST34).

If the serviceman determines as the result of diagnosis that the adjustment of a portion corresponding to the maintenance item is necessary (ST35), the adjusting operation item is displayed on the display screen (ST36). On the display screen, the name of the component part of a portion which requires the adjustment, the name of the model of the component part, the lot number, the adjusting method and the operation items are displayed.

The serviceman effects the adjusting operation of the necessary portion for each operation item based on the adjusting method displayed on the display screen (ST37).

When the adjusting operation is completed, the copying machine is reset and the setup thereof after the adjustment is effected (ST38).

Then, the adjustment item, the name of the part, the name of the model and the specially mentioned item on the operation which are used for effecting the adjusting operation are input from the service support tool and stored into the non-volatile RAM 34 of the subunit 3 (ST39). That is, data corresponding to various information items input from the service support tool is stored into the service information B area 48 of the non-volatile RAM 34.

When all of the operations are completed, the maintenance operation is terminated. If all of the operations are not completed, the process is returned to the step 34 to effect the maintenance diagnosing operation.

If the serviceman determines as the result of diagnosis of the maintenance item that a portion associated with the corresponding maintenance item must be replaced (ST35), the replacing operation item is displayed on the display screen of the service support tool (ST40). On the display screen, the name of the component part of a portion which requires the replacement, the name of the model of the component part, the lot number, the unit price, the state of the stock and the replacing method are displayed.

The serviceman effects the operation of replacing a necessary portion based on the replacing method displayed on the display screen (ST41).

After the replacing operation is completed, the copying machine is reset and the setup thereof is effected (ST42).

Then, the name of the part, the name of the model, the lot number, the unit price and the specially mentioned item on the operation which are used for effecting the replacing operation are input from the service support tool and stored into the non-volatile RAM 34 of the subunit 3 (ST43). That is, data corresponding to various information items input from the service support tool is stored into the service information B area 48 of the non-volatile RAM 34.

When all of the operations are completed, the maintenance operation is terminated. If all of the operations are not completed, the process is returned to the step 34 to effect the maintenance diagnosing operation.

As described above, the image forming apparatus of this invention has a subunit including a non-volatile RAM or a storage unit which stores data used in the manufacturing process and corresponding to ID information items of parts constructing the image forming apparatus and ID information of the main body of the image forming apparatus and data used at the time of service operation and corresponding to history information of parts and maintenance information thereof.

Therefore, in the manufacturing process, data corresponding to ID information previously stored in the non-volatile RAM of the subunit is compared with data corresponding to ID information of a part to be incorporated so as to determine whether the part is proper or not, thereby making it possible to prevent occurrence of an erroneous operation such as an operation of mistakenly incorporating a part. Therefore, an image forming apparatus with high reliability can be provided. Further, since whether the part is proper or not is determined for each part to be incorporated by the operator in the production line, the operator will not be confused and mass production of various types of image forming apparatuses with high reliability can be attained by use of a less number of production lines. As a result, the cost of the image forming apparatus can be lowered.

Further, data corresponding to maintenance information and history information on the adjustment and replacement of parts previously stored in the non-volatile RAM of the subunit is stored. Therefore, in the service operation, the serviceman can effect the operation while observing and checking a portion which requires the service, the adjusting method, the replacing method or the like on the display screen of the service support tool by reading and displaying the above necessary information items on the display screen of the service support tool, and as a result, the service quality can be enhanced.

As described above, according to this invention, an image forming apparatus with which the service quality and the reliability can be enhanced, a manufacturing method thereof, and maintenance method therefor can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method for assembling an image forming apparatus which includes image forming means for forming an image on a recording medium, communication means for communicating data between the image forming means and an external device, and storage means provided in the image forming means, for storing data relating to parts constructing the image forming means, comprising the steps of:

connecting the storage means and the external device to each other by use of the communication means;

comparing data of a part input via the communication means by the external device with data of a preset part stored in the storage means to determine whether the input data of the part is proper or not;

assembling a part which is determined to be proper in said determining step; and storing data of the part assembled in said assembling step into the storage means.

2. An image forming apparatus assembling method according to claim 1, further comprising a step of incorporating the storage means into the image forming means after all of the parts constructing the image forming means are incorporated.

3. An image forming apparatus assembling method according to claim 1, further comprising a step of determining whether the adjustment for the part assembled in said assembling step is necessary or not; a step of outputting information relating to an adjusting method to the external device when the adjustment is necessary; a step of adjusting the part based on the adjusting method output to the external device; and a step of storing data of the part which is adjusted in said adjusting step into the storage means.

4. An image forming apparatus assembling method according to claim 1, wherein the storage means includes a first storage area which previously stores data relating to various parts necessary for constructing the image forming means, and a second storage area for storing data relating to the parts incorporated to construct the image forming means in said assembling step.

5. An image forming apparatus assembling method according to claim 3, wherein the storage means includes a third storage area which previously stores data relating to a method for adjusting a part which requires the adjustment among the parts constructing the image forming means, and a fourth storage area for storing adjustment data relating to the part adjusted in said adjusting step.

6. An image forming apparatus comprising:

image forming means for forming an image on a recording medium;

communication means for communicating data between said image forming means and an external device; and storage means including a first storage area which previously stores data relating to parts necessary for constructing said image forming means and read out and supplied to the external device via said communication means when the parts are assembled and a second storage area for storing data input from the external device via said communication means after the parts are assembled and relating to the parts assembled to construct said image forming means.

7. An image forming apparatus according to claim 6, wherein said storage means includes a third storage area which previously stores data relating to a method for adjusting a part which requires the adjustment among the parts constructing said image forming means and read out and supplied to the external device via said communication means when the part is adjusted, and a fourth storage area for storing adjustment data input from the external device via said communication means after the part is adjusted and relating to the adjusted part.

8. An image forming apparatus according to claim 6, wherein said storage means includes a fifth storage area which previously stores data relating to a method for maintaining the parts constructing said image forming means and read out and supplied to the external device via said communication means when the maintenance operation is effected for the parts, and a sixth storage area for storing maintenance data input from the external device via said communication means after the maintenance operation is effected for the parts.

9. A manufacturing system for manufacturing an image forming apparatus which includes image forming means for forming an image on a recording medium, and storage means provided in the image forming means, for storing data relating to parts constructing the image forming means, comprising:

input means for inputting data relating to a part assembled to construct the image forming means;

communication means connected to the storage means, for communicating data with respect to the storage means;

determining means for comparing data relating to a part to be assembled and input from said input means with data relating to the part read out from the storage means via said communication means to determine whether the part to be assembled is proper or not; and output means for outputting data relating to the part which is determined to be proper by said determining means to the storage means via said communication means.

10. A maintenance method for an image forming apparatus which includes image forming means for forming an image on a recording medium, communication means for communicating data between the image forming means and an external device, and storage means provided in the image forming means, having a first memory area where ID data identifying the parts constructing the image forming means is stored in advance, and a second memory area where data associated with a maintenance record of a part subjected to a maintenance process is stored, comprising the steps of:

connecting the storage means and the external device to each other by use of the communication means;

reading out data that is associated with the maintenance record of the part stored in the second memory area and that corresponds to the ID data stored in the first memory area, and supplying the data to the external device;

carrying out maintenance work on the part which corresponds to the ID data reading out from the first memory area in said readout step; and storing data of the part subjected to the maintenance process in said carrying out step, as the maintenance record, into the second memory area, such that the data corresponds to the part whose ID data is stored in the first memory area.

* * * * *